United States Patent
Stein et al.

(10) Patent No.: US 7,529,921 B2
(45) Date of Patent: May 5, 2009

(54) FAST INITIALIZATION OF MEDICAL DEVICE SYSTEM HAVING MULTIPLE OPERATING SYSTEMS

(75) Inventors: Richard E. Stein, Edina, MN (US); Michael W. Barton, St. Louis Park, MN (US); Lihong Cao, Maplewood, MN (US); Steve Hidem, Plymouth, MN (US); Eugene Khenson, Santa Clara, CA (US); Binita Sinha, Blaine, MN (US); Firass Shehadeh, Maple Grove, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 528 days.

(21) Appl. No.: 11/253,000

(22) Filed: Oct. 18, 2005

(65) Prior Publication Data

US 2006/0133362 A1    Jun. 22, 2006

Related U.S. Application Data

(60) Provisional application No. 60/637,187, filed on Dec. 17, 2004.

(51) Int. Cl.
*G06F 9/00* (2006.01)
(52) U.S. Cl. .................... 713/1; 713/2; 719/310
(58) Field of Classification Search ............ 713/1, 713/2; 719/310
See application file for complete search history.

(56) References Cited

U.S. PATENT DOCUMENTS

| | | | |
|---|---|---|---|
| 4,430,704 A | 2/1984 | Page et al. | |
| 4,663,707 A | 5/1987 | Dawson | |
| 4,691,282 A | 9/1987 | Kinashita | |
| 4,709,349 A | 11/1987 | Hashimoto et al. | |

(Continued)

FOREIGN PATENT DOCUMENTS

EP    0845742    6/1998

(Continued)

OTHER PUBLICATIONS

*Advanced Configuration and Power Interface Specification, Revision 1.0b,* Intel Microsoft Toshiba,(Feb. 2, 1999),pp. 1-397.

(Continued)

*Primary Examiner*—Thomas Lee
*Assistant Examiner*—Vincent T Tran
(74) *Attorney, Agent, or Firm*—Schwegman, Lundberg & Woessner, P.A.

(57) ABSTRACT

A system including a communication circuit and a microprocessor operable to execute instruction code associated with at least a first operating system and a second operating system. The system also includes a volatile system memory to store executable code, a nonvolatile memory to store executable startup code, and nonvolatile image storage to store at least one captured state image. The captured state image includes an image of system memory in a captured state associated with a non-executing operating system. The system further includes a system transition routine to transition between the executing operating system and the non-executing operating system when an application to be run on the microprocessor requires the non-executing operating system. The system transition routine converts content of volatile memory and microprocessor registers to a captured state in accordance with the non-executing operating system captured state image stored in the nonvolatile image storage.

58 Claims, 3 Drawing Sheets

U.S. PATENT DOCUMENTS

| | | | |
|---|---|---|---|
| 4,720,812 A | 1/1988 | Kao et al. | |
| 4,959,774 A | 9/1990 | Davis | |
| 5,155,833 A | 10/1992 | Cullison et al. | |
| 5,269,022 A | 12/1993 | Shinjo et al. | |
| 5,278,973 A | 1/1994 | O'Brien et al. | |
| 5,339,426 A | 8/1994 | Aoshima | |
| 5,355,490 A | 10/1994 | Kou | |
| 5,404,546 A | 4/1995 | Stewart | |
| 5,410,711 A | 4/1995 | Stewart | |
| 5,519,869 A | 5/1996 | Payne et al. | |
| 5,524,249 A | 6/1996 | Suboh | |
| 5,530,673 A | 6/1996 | Tobita et al. | |
| 5,548,765 A | 8/1996 | Tsunoda et al. | |
| 5,578,064 A | 11/1996 | Prutchi | |
| 5,590,340 A | 12/1996 | Mortia et al. | |
| 5,615,376 A | 3/1997 | Ranganathan | |
| 5,619,707 A | 4/1997 | Suboh | |
| 5,638,541 A | 6/1997 | Sadashivaiah | |
| 5,640,574 A | 6/1997 | Kawashima | |
| 5,710,930 A | 1/1998 | Laney et al. | |
| 5,764,984 A | 6/1998 | Loucks | |
| 5,862,083 A | 1/1999 | Tobita et al. | |
| 5,925,129 A | 7/1999 | Combs et al. | |
| 5,963,219 A | 10/1999 | Choi | |
| 5,968,173 A | 10/1999 | Watts, Jr. | |
| 5,978,922 A | 11/1999 | Arai et al. | |
| 6,026,486 A | 2/2000 | Kodama et al. | |
| 6,029,086 A | 2/2000 | Kim et al. | |
| 6,098,158 A | 8/2000 | Lay et al. | |
| 6,101,601 A | 8/2000 | Matthews et al. | |
| 6,134,602 A * | 10/2000 | Engstrom et al. | 719/328 |
| 6,173,417 B1 | 1/2001 | Merrill | |
| 6,178,503 B1 | 1/2001 | Madden et al. | |
| 6,209,088 B1 | 3/2001 | Reneris | |
| 6,243,831 B1 | 6/2001 | Mustafa et al. | |
| 6,273,856 B1 | 8/2001 | Sun et al. | |
| 6,275,727 B1 | 8/2001 | Hopper et al. | |
| 6,280,389 B1 | 8/2001 | Ding et al. | |
| 6,336,174 B1 | 1/2002 | Li et al. | |
| 6,385,721 B1 | 5/2002 | Puckette | |
| 6,393,560 B1 * | 5/2002 | Merrill et al. | 713/2 |
| 6,408,397 B1 | 6/2002 | Alexander et al. | |
| 6,411,850 B1 | 6/2002 | Kay et al. | |
| 6,418,343 B1 | 7/2002 | Zhang et al. | |
| 6,421,777 B1 | 7/2002 | Paul et al. | |
| 6,434,696 B1 | 8/2002 | Kang | |
| 6,505,071 B1 | 1/2003 | Zhu et al. | |
| 6,532,538 B1 | 3/2003 | Cronk et al. | |
| 6,615,303 B1 * | 9/2003 | Endo et al. | 710/260 |
| 6,628,289 B1 * | 9/2003 | Murata | 345/505 |
| 6,636,963 B1 * | 10/2003 | Stein et al. | 713/1 |
| 6,915,417 B2 | 7/2005 | Stein et al. | |
| 7,313,684 B2 * | 12/2007 | O'Connell | 713/2 |
| 7,356,677 B1 * | 4/2008 | Rafizadeh | 713/1 |
| 2001/0018717 A1 * | 8/2001 | Shimotono | 709/319 |
| 2002/0078338 A1 * | 6/2002 | Lay et al. | 713/2 |
| 2002/0091917 A1 | 7/2002 | Liao | |
| 2003/0115443 A1 | 6/2003 | Cepulis et al. | |
| 2005/0240755 A1 | 10/2005 | Stein et al. | |

OTHER PUBLICATIONS

"Advanced Configuration and Power of Interface Specification", *Hewlett-Packard Corporation, Intel Corporation, Microsoft Corporation, Phoenix Technologies, Ltd and Toshiba Corporation*, Revision 3.0,(Sep. 2, 2004),618 pgs.

Chen, C., et al., "Dynamic Memory Allocation using Fixed Size Blocks in a Shared Memory Space", *IBM Patent Technical Disclosure Bulletin*, 38(8), (Aug. 1995),189-190.

IBM TDB, "Automatic Data Compression Control for Hibernation", vol. 39 No. 4, (Apr. 1996),185-186.

IBM TDB, "Operating System and Machine Independent Hibernation", vol. 38 No. 5, (May 1995),143-144.

O'Quin, J. T., et al., "Hibernating and Resuming using a Compressed Memory Image", *IBM Patent Technical Disclosure Bulletin*, 38(8), (Aug. 1995),73-74.

* cited by examiner

FAST INITIALIZATION OF MEDICAL DEVICE SYSTEM HAVING MULTIPLE OPERATING SYSTEMS

CROSS REFERENCE TO RELATED PATENT DOCUMENTS

Priority Claim: The present application claims priority to U.S. provisional application Ser. No. 60/637,187, filed Dec. 17, 2004, titled FAST INITIALIZATION OF SYSTEM HAVING MULTIPLE OPERATING SYSTEMS, and which is incorporated herein by reference.

Related Patent: U.S. Pat. No. 6,636,963 is generally related to the present document, and is hereby incorporated by reference.

TECHNICAL FIELD

The field generally relates to computing devices and methods for operating computers and other types of microprocessor-based systems having multiple operating systems. In particular, it relates to systems and methods for initializing operating systems and for switching between operating systems of a microprocessor-based device, such as an external programmer used to communicate with a cardiac rhythm management device.

BACKGROUND

In order for a computer or other microprocessor-based system to be in an operational state capable of executing multiple application programs (i.e., those programs that give the system specific functionality), the system must be under the supervisory control of operating system (OS) software. This operational state involves particular code and data being stored in memory that enable the OS to maintain supervisory control over how the system resources are allocated to the various application processes. The usual means by which the operational state is reached is through a boot sequence, in which the processor (CPU) first begins executing (e.g., upon powering up from a powered down condition) at a specific location in a nonvolatile read-only memory (ROM). That is, the program counter of the CPU (or instruction pointer in Intel x86 architectures) is initially loaded with the starting address of the BIOS (basic input/output system) software in the ROM. The BIOS code contained in the ROM defines the basic steps taken by the system when it starts, including hardware detection and initialization and loading of the operating system by a bootstrap loader. Execution of the bootstrap loader causes the boot record of the storage medium containing the operating system software (e.g., a hard disk, floppy, or CD-ROM) to be read into system memory, which is usually volatile dynamic random access memory (DRAM). The boot record contains a boot program which is then executed to begin the process of loading the operating system into memory from the storage medium.

The process of booting the device is time-consuming because the operating system must perform certain computations to configure itself for the particular device, including hardware detection/initialization, initialization of OS services, initialization of a graphical windowing system, and the building of various data structures. Applications being run on the computing device require the use of a specific operating system. There are different operating systems that can be installed in a computing device. If an application executed by the device requires the use of a different operating system, then the initial operating system is shut down and the other operating system is booted into the device. The shut down of the initial operating system and booting of the subsequent operating system takes a substantial period of time. Moreover, if the initial operating system is the predominantly used operating system, then the device uses another substantial amount of time to switch back to the initial operating system. Accordingly, there is need to quickly boot a variety of operating systems in a computing device such as a medical device or medical device programmer.

SUMMARY OF THE INVENTION

The present inventors have recognized a need for improved operation of microprocessor-based medical device programmers. This document discusses, among other things, systems and methods provided for quickly transitioning a microprocessor-based system from power-on-reset to a fully running primary operating system, and to quickly transition such a system from a first operating system to a second operating system. One system embodiment includes a communication circuit and a microprocessor coupled to the communication circuit. The microprocessor is operable to execute instruction code associated with at least a primary operating system and a secondary operating system. Only one operating system executes at a time and a portion of the instruction code is executed to communicate with a medical device. The system also includes a volatile system memory to store executable code including the code of an executing operating system, a nonvolatile memory to store executable startup code, and nonvolatile image storage. The nonvolatile image storage stores at least one captured state image. The captured state image includes an image of memory and microprocessor registers in a captured state where the captured state is associated with a non-executing operating system. The system further includes a system transition routine to transition the system between the executing operating system and the non-executing operating system when an application to be run on the microprocessor requires the non-executing operating system. The system transition routine converts content of volatile memory and microprocessor registers to a captured state in accordance with the non-executing operating system captured state image stored in the nonvolatile image storage.

One method embodiment includes interrupting a first operating system executing on a microprocessor-based system when an application associated with a second non-executing operating system is selected for execution on the system, retrieving a captured memory image and a captured state data structure associated with the second operating system from image storage, storing the retrieved memory image in volatile memory, and transferring system control to the second operating system.

This summary is intended to provide an overview of the subject matter of the present patent application. It is not intended to provide an exclusive or exhaustive explanation of the invention. The detailed description is included to provide further information about the subject matter of the present patent application.

DETAILED DESCRIPTION OF THE INVENTION

In the following detailed description, reference is made to the accompanying drawings which form a part hereof, and specific embodiments in which the invention may be practiced are shown by way of illustration. It is to be understood that other embodiments may be used and structural or logical changes may be made without departing from the scope of the present invention.

Figure 1:
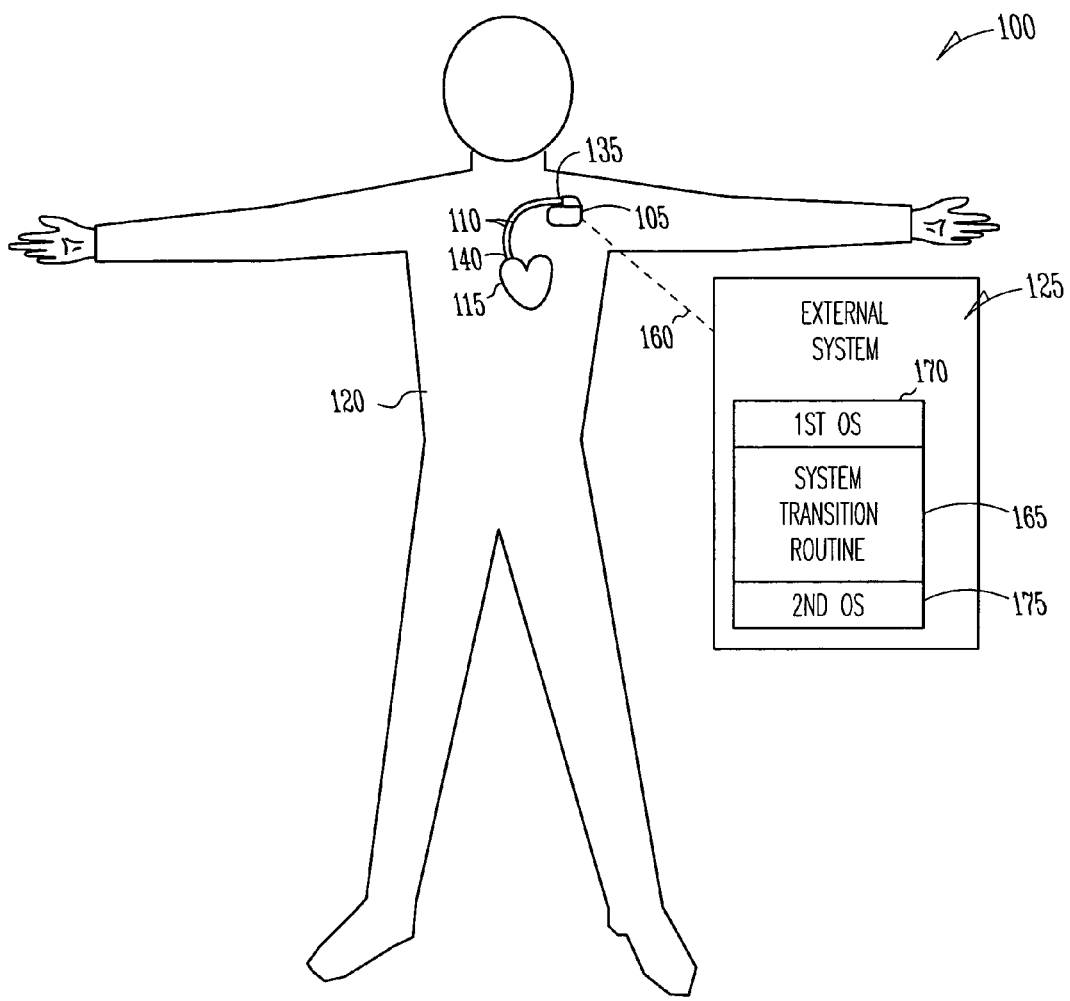
FIG. 1 illustrates an embodiment of portions of a system that includes an implantable medical device and an external device with two operating systems.

The present application discusses, among other things, systems and methods for transitioning a microprocessor-based system from a primary operating system to a captured state of a secondary operating system and to transition back to the primary operating system. FIG. 1 illustrates an embodiment of portions of a system 100 that uses an implantable medical device (IMD) 105 to treat cardiac arrhythmia. A pulse generator (PG) or other IMD 105 is coupled by a cardiac lead 110, or additional leads, to a heart 115 of a patient 120. Examples of an IMD 105 include, without limitation, a pacer, a defibrillator, a cardiac resynchronization therapy (CRT) device, or a combination of such devices.

Cardiac lead 110 includes a proximal end 135 that is coupled to IMD 105 and a distal end 140, coupled by an electrode or electrodes to one or more portions of a heart 115. The electrodes are for delivering atrial and/or ventricular cardioversion/defibrillation and/or pacing and/or resynchronization therapy to the heart 115. IMD 105 includes components that are enclosed in a hermetically-sealed canister or "can." Additional electrodes may be located on the can, or on an insulating header, or on other portions of IMD 105, for providing unipolar pacing and/or defibrillation energy in conjunction with the electrodes disposed on or around heart 115. The lead or leads 110 and electrodes are also used for sensing electrical activity of a heart 115.

System 100 also includes an IMD programmer or other external system 125 that typically provides wireless communication signals 160 to communicate with the IMD 105, such as by using telemetry or radio frequency (RF) signals. The external system 125 is a microprocessor-based device that includes a system transition routine 165 to switch between a first, primary operating system 170 and a second, non-primary (or secondary) operating system 175. The external device 125 normally runs in the primary operating system 170. When a user, such as a clinician, turns on the external system 125, a fast initialization of the primary operating system 170 is executed during power-up to allow almost instantaneous use of the external device 125 after turning the power on. When the user desires to run an application on the external device 125 that requires the secondary operating system 175, the external system 125 stops execution of the primary operating system 170, performs a fast initialization of the secondary operating system 175, and runs the desired application. When the user exits the application, the external device 125 performs a fast initialization of the first operating system 170. In some embodiments, the external device 125 is capable of transitioning from an assertion of power-on-reset to a primary operating system to a secondary operating system in less than seven seconds.

According to some embodiments, the external device 125 switches among three or more operating systems. One operating system is the primary operating system, and applications to be run on the external device 125 cause one of two or more secondary operating systems to execute depending on the desired application.

Automatically transitioning between operating systems according to applications to be run on the external device has several advantages. It simplifies use of the external device because a user does not have to know what OS is required by a desired application. Also, because a new OS is restored and initialized quickly, the user does not have to wait for a lengthy OS initialization to execute. Further, existing applications developed for the external device that used a previous, or old OS do not need to be redeveloped using a current, or new, OS. This saves the cost of redeveloping existing applications.

Figure 2A:
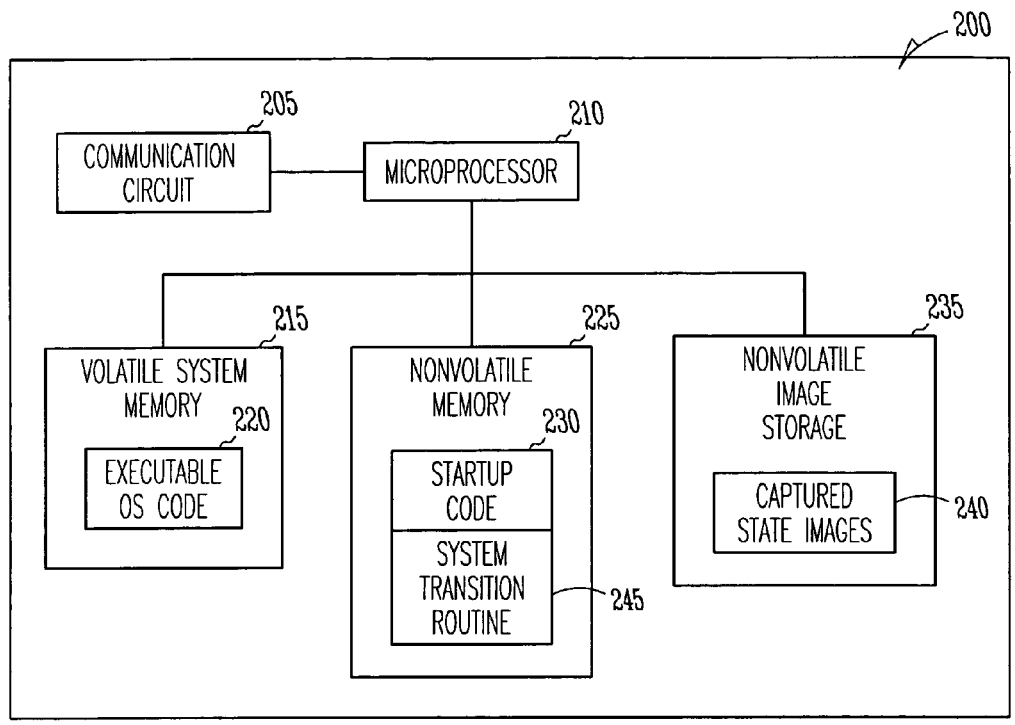
FIG. 2A is a bock diagram of an embodiment of portions of a microprocessor-based system for communication with a medical device.

FIG. 2A is a bock diagram of an embodiment of a microprocessor-based system 200. In some embodiments the system 200 is a microprocessor-based computing device. Examples include desktop computers, laptop computers, personal data assistants (PDAs), and the like. In some embodiments, the microprocessor 210 is a sixteen bit or greater microprocessor. The microprocessor 210 executes instruction code associated with at least a first operating system (OS) and a second OS, but only executes instruction code from one operating system at a time.

According to some embodiments, the system 200 is for communication with a medical device. In some embodiments, the medical device is an implantable medical device (IMD). The system 200 comprises a communication circuit 205 and a microprocessor 210 coupled to the communication circuit 205. At least a portion of the instruction code is executed to facilitate communication with the medical device. The system 200 communicates with a medical device via wireless or wired signals. In some embodiments, the signals are wireless communication signals, such as telemetry or radio frequency (RF) signals. For example, the wireless communication signals include frequencies within the Industrial Scientific and Medical band (ISM) or within the Short Range Devices (SRD) frequencies. In other embodiments, the signals are communicated through a computer port such as a serial or parallel port. In further embodiments, the system 200 or the medical device include web or other network interface circuits and the signals are communicated using the internet or other computer network.

The system 200 also comprises volatile system memory 215 to store code 220 executable by the microprocessor 210, nonvolatile memory 225 to store executable startup code 230, and nonvolatile image storage 235 to store at least one captured state image 240 associated with a non-executing OS. A non-executing OS can be either a primary or a secondary OS. A captured state image 240 includes the content of memory and microprocessor registers that correspond to a captured state of the system 200. Embodiments of the volatile system memory 215 include random access memory (RAM) such as dynamic random access memory (DRAM) or static random access memory (SRAM). Nonvolatile memory refers to memory that does not lose its contents when power is turned off. Embodiments of nonvolatile memory 225 and nonvolatile image storage 235 include programmable read only memory PROM, erasable programmable read only memory (EPROM), electrically erasable programmable read only memory (EEPROM), battery-backed RAM, flash read only memory (flash), disk memory, hard disk memory, an optical storage medium, or any combination of these nonvolatile memories.

The system 200 further comprises a system transition routine 245 to transition between an OS executing on the system 200 and a non-executing OS when an application to be run on the microprocessor 210 requires the non-executing OS. The system transition routine 245 converts the content of volatile system memory 215 and microprocessor registers to a captured state of the non-executing OS. The captured state corresponds to a captured state image 240 of memory stored in the nonvolatile image storage medium 235. In some embodiments, the captured state image 240 corresponds to a quiescent, or idle, state of a non-executing OS after initialization. In some embodiments, the captured state image 240 corresponds to state of a non-executing OS captured at a point part-way through initialization of the system 200. A captured state image 240 for an OS can be thought of as a snapshot taken of the volatile system memory 215, microprocessor registers, and all hardware that has been initialized by the OS at the time snapshot is taken. Bringing the system 200 to this captured state from the stored image looks like the system 200 just arrived at the captured point of the OS because there is no difference between this point and the restored state with respect to anything accessible to and used by the OS. Additional issues involved are making the OS aware of the time difference between saved image time and current time, and possible file system changes.

These possible file system changes include the installation of any new software applications, any changes or upgrades to an OS, changes to configuration files, and changes to settings of the system 200. Some file system changes (such as use of any temporary files) are expected at run-time and are therefore designed to be located in RAM disk or on a disk partition that is independent of the captured state image.

Some embodiments include at least one captured state image associated with the secondary operating system and at least one captured state image associated with the primary operating system. Some embodiments of captured state images 240 include the corresponding OS, device drivers, windowing system, and user application. In some of the embodiments, the captured state image does not include all of the device drivers. The excluded drivers are started after the OS is restored from an image. Depending on the amount of memory available, some embodiments of a captured state image include contents of a video memory. This provides for fast initialization of video displays. In some embodiments, the system 200 paints the video display after restoring the OS to save image file size and loading time.

The system transition routine 245 is implemented as part of a system initializer routine, such as a basic input output system (BIOS) for example. In some embodiments, the BIOS for the system 200 is comprised of three parts: a diagnostic BIOS, an operational BIOS, and an image manager BIOS that includes the system transition routine 245. The diagnostic BIOS is an off-the-shelf BIOS that searches for installed hardware and tests the hardware. The operational BIOS is normally invoked on power-up. The operational BIOS performs initializes the system hardware to a known state. The operational BIOS then passes control of the system 200 to the image manager BIOS. The image manager BIOS includes the system transition routine 245 and is capable of moving images of memory from the nonvolatile image storage 235 to the volatile system memory 215.

The system transition routine 245 includes three phases: a memory allocation phase, an image loading phase, and a switching phase. In the memory allocation phase, a contiguous amount of volatile system memory 215 of adequate size is reserved to store an image file. The image file is read from the nonvolatile image storage 235 and loaded into the reserved system memory. The location of the reserved memory location is retained.

During the image loading phase, the image is transferred from nonvolatile image storage 235 to the allocated memory. In some embodiments, the image is loaded from the nonvolatile image storage 235 to the allocated memory. In some embodiments, the image is preloaded into volatile system memory 215 before being transferred to the allocated memory. The system transition routine 245 includes code that is capable of reading data from contiguous volatile memory 215 or from a file in nonvolatile image storage 235. This allows the system transition routine 245 to restore a captured state image 240 stored on any kind of storage media. Reading data from the volatile system memory 215 is useful for fast switching between operating systems. Reading data from a file in nonvolatile disk storage is useful during development, or when the available amount of nonvolatile flash memory is constrained.

To make the system transition routine 245 independent of any OS, paging mechanisms are turned off. Paging is a technique in which the operating system allocates units of memory called pages in a linear address space and maps those pages to page frames in physical address space (i.e., to physical locations in memory). Turning off paging allows the system transition routine 245 to access all physical memory, independently of the page tables currently in use by any OS. Because paging is turned off during execution of the system transition routine 245, paging must be restored when control is passed from the system transition routine 245 to the executing OS. In some embodiments, the captured state image includes a memory and a captured state data structure. The memory image corresponds to pages in a linear address space that are mapped in the captured state into page frames of physical address space by a paging mechanism. The captured state data structure includes values for the microprocessor registers when the microprocessor 210 is in the corresponding captured state. In the embodiments, the system transition routine 245 further includes code to retrieve the memory image and captured state data structure from nonvolatile image storage 235, load microprocessor registers with values from the data structure, and store the memory image in the volatile system memory 215 in a manner that restores the page frames of the captured state.

The size of an image depends on the OS and the services and application associated with the image. In an embodiment, the system transition routine 245 includes a protection mechanism in which a flag is set after the stored image file is completely loaded into the allocated system memory. If an OS switch is attempted before the flag is set, the OS switch is not initiated and an error is returned to the executing OS. This prevents the system 200 from attempting to switch while the image is still loading. In another embodiment, when an error is returned during a switch attempt, the system transition routine loops on the switch attempt until the switch to the new OS succeeds.

During the switching phase from a first OS to a second OS, the system transition routine 245 switches the system pointers from the working variables for the first OS to working variables for the second OS once the image is loaded into the allocated system memory. Control is then transferred to the second OS.

In some embodiments, the system transition routine 245 provides an interface for a block of data to be saved in memory by the primary OS and transferred into the memory space of the secondary OS. In some embodiments, the interface includes a data structure. This allows for data parameters to be passed from the primary OS to the secondary OS. The data parameters can be used as input parameters to control execution of the application running in the secondary OS. In some embodiments, the interface includes a reserved area of volatile system memory 215 accessible by both the primary and secondary OS. This reserved area is not overwritten by the system transition routine 245 when restoring a captured state image 240.

According to some embodiments of the system 200, the system transition routine 245 switches between the QNX operating system and the Linux operating system. In some embodiments, the nonvolatile image storage 235 includes at least one captured state image 240 associated with a QNX operating system, and the system transition routine 245 converts contents of the volatile system memory to a QNX captured state image 240 by loading the QNX image directly from the nonvolatile image storage 235. The nonvolatile image storage 235 also includes at least one captured state image 240 associated with a Linux operating system, and the system transition routine 245 converts contents of the volatile system memory 215 to a Linux captured state image by loading the Linux image directly from the nonvolatile image storage 235. In some of the embodiments, a captured state image 240 is loaded from a file on a FAT16 partition or FAT32 partition on a hard disk drive. To prevent delays when switching between operating systems, some embodiments of the system transition routine 245 include code to prevent a disk drive from spinning down. For example, the code prevents the disk drive from entering a sleep mode. This is useful to provide a rapid switch from a non-primary OS back to a primary OS.

In some embodiments, the nonvolatile image storage 235 includes a first captured state image 240 associated with a QNX operating system within a second captured state image 240 associated with a Linux operating system, and the system transition routine 245 converts contents of the volatile system memory 215 to a QNX captured image by first retrieving the Linux captured image from the nonvolatile image storage 235. In some of the embodiments, the nonvolatile image storage 235 includes a captured state image 240 of a secondary QNX operating system stored as a file in the volatile system memory 215 when a primary OS captured state image is restored. The captured QNX state image is stored in an area of volatile system memory 215 that is not used by the QNX operating system. Thus, when the QNX OS is restored by the system transition routine 245, it does not overwrite the captured QNX state image. By storing the captured QNX state image in an area of volatile system memory 215 where the system transition routine 245 does not have to check if the allocated memory space overlaps the image memory space, the system transition routine 245 accesses the secondary OS captured state image faster than if it was stored in the nonvolatile image storage 235.

When capturing a state image for a primary Linux OS, a QNX captured state image is read from nonvolatile image storage 235 and is stored in the volatile system memory 215. The Linux OS is then captured in this state. When the primary Linux OS state is captured into an image, the image will also contain the QNX captured state image. This allows the QNX captured state image to be available immediately after restoration and initialization of the Linux OS has completed. To restore the QNX OS, the system transition routine accesses volatile system memory 215 without needing to access nonvolatile image storage 235.

In some embodiments, the system 200 includes a captured state image 240 of a primary software application and a secondary software application that both execute under the same OS. It may be a faster alternative to change from the primary application to the secondary application by loading and initializing a captured state image for the secondary application rather than fully stopping the OS and initializing the second application, especially if the captured state image 240 is already available in volatile system memory 215. The system transition routine 245 is used to convert contents of volatile system memory 215 from the executing OS to a captured state image 240 of the executing OS initialized to a state corresponding to a different software application.

The system transition routine 245 uses variables stored as at least one data structure to locate a captured state image 240 and access the image. The data structure specifies whether a captured image file is located in volatile system memory 215, on a hard disk, or located in other nonvolatile memory such as flash or EPROM memory. The data structure includes an address and the size of the image 240. The meanings of some variables of the data structure change based on the medium where the file is located. In some embodiments, working variables used by the system transition routine 245 also are included in at least one data structure. The working variables include linear and physical address pointers, microprocessor 210 control registers, and stack pointer values.

Figure 2B:
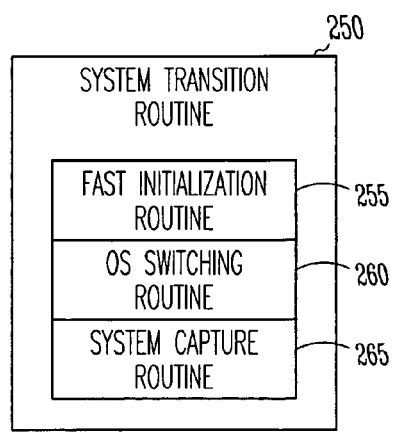
FIG. 2B is a block diagram of an embodiment of portions of a system transition routine.

FIG. 2B shows an embodiment of a system transition routine 250 that includes a fast initialization routine 255 and an OS switching routine 260. The fast initialization routine 255 handles the memory allocation and image loading phase of the system transition routine 250. The routine 255 loads a captured state image 240 and converts content of volatile system memory 215 and microprocessor registers to a captured state of the non-executing OS. The OS switching routine 260 transitions control of the system 200 to the non-executing OS. In some embodiments, the fast initialization routine 255 includes a direct memory access (DMA) controller initialization routine to load a captured state image 240 and convert content of volatile system memory 215 to a captured state of the non-executing OS. In the embodiments, the OS switching routine converts the content of microprocessor registers in accordance with the captured state.

To create captured state images 240, some embodiments of the system transition routine 250 include a system capture routine 265. The system capture routine 265 captures an image of volatile system memory 215 and stores the captured state image on the nonvolatile image storage 235. The system transition routine 250 operates outside of any particular OS during the capture of a state image or the loading of a captured state image 240. When an OS is restored from an image, the system hardware needs to be in a clean or non-active state. Therefore, the device drivers for the hardware need to be in this state when an image of the OS is captured. For this reason, all interrupts are disabled during capture, and all pending interrupts are serviced before saving the contents of volatile system memory 215. Interrupts are re-enabled when the system transition routine 245 finishes restoring an OS from a captured state image 240 and control is relinquished back to the OS.

An analogous sequence of events happens with the paging mechanism and hard disk file systems during capture. Because paging is an OS-dependent layer between physical memory and the applications accessing it, paging needs to be disabled while the system transition routine 250 is capturing or loading a captured state image 240 to provide unlimited and simple access to the physical memory. After a captured image 240 is saved in the nonvolatile image storage 235 or loaded into volatile system memory 215, paging is re-enabled. Also, the contents of the system hard disk will be different each time the system 200 is transitioned to a specific OS. Because the contents change, the hard disk file system drivers need to become aware of the current contents of the hard disk upon an OS restore. One method to accomplish this is to have the file system unmounted before capture so that the file system driver does not use the hard disk. Upon restoring an OS, the file system is mounted and the current file system is read in.

In capturing a state image, files to hold a captured image 240 are created first and are allocated enough storage to hold the captured OS state image 240. An image file header is created for each image file. The image file header contains data needed by the system transition routine 250 to restore the image, e.g. the size or amount of relevant data within the file, or a version of the stored captured state image 240. The contents of the image file header are calculated and saved into the image file before the actual image data is saved. Not all physical system volatile system memory 215 is actively used by an OS at any given time. Image file sizes can be reduced by excluding the unused memory when creating a captured state image 240. Thus, only the actual memory in use is captured into a captured image file. The resulting captured state image 240 is a reduced copy of the contents of volatile system memory 215 in the captured state. In some embodiments, data compression may be used to reduce the size of the captured state image file. However, even though the resulting image file is smaller, restoring the image file may result in a longer initialization time due to the additional time required to uncompress the file.

According to some embodiments memory laundering is used during the capture process to reduce the size of the image file. Memory laundering refers to any method or combination of methods used to reduce or eliminate the amount of unnecessary data stored in the captured state image 240. In some embodiments, the system capture routine 265 creates a volatile system memory 215 bitmap (called a "RAM bitmap" for convenience) to identify used pages of physical memory.

In some embodiments, a RAM bitmap is created by parsing the OS structures responsible for memory allocation. In some embodiments, the system capture routine 265 requests the OS to perform memory management operations to free volatile system memory 215 used as disk cache. The more aggressive the OS is at freeing this memory, the more the system 200 will need to access hard disk each time the OS is loaded and restored. In some embodiments, the OS only frees enough memory for the desired size of a captured state image file. The OS returns control to the system capture routine 265 after performing the memory management functions. In an OS such as QNX, the structures would include page tables because they contain complete information about used physical memory. In an OS such as Linux, the structures would include many linked lists that would require detailed knowledge about the memory use, and these linked lists may change with a new OS version.

In some embodiments, a RAM bitmap and a Zero bitmap are created. The system capture routine 265 reserves all memory not in use by any other process in the system. Pages in use are marked as used in the RAM bitmap and pages that are reserved are marked as unused in the RAM bitmap. Any data in pages marked as unused can be discarded. A memory laundering process called "squeezing" is then used to further reduce the file size.

In "squeezing" the Ram bitmap is passed to the system transition routine 245. In an embodiment, at least one data structure is used to pass the bitmap information from an OS to the system transition routine 245, 250. The system transition routine 245, 250 scans the pages marked as used in the Ram bitmap for pages filled with all zeros. These pages are then marked as unused in the RAM bitmap and are marked as used in a Zero bitmap. Because these pages were used by the OS, they must be zeroed out upon restore of the OS. The pages marked in the RAM bitmap and the pages marked in the Zero bitmap are the pages to be allocated for the OS upon an image load and an OS restore. Pages marked as unused in the RAM bitmap don't need to be restored with the OS. All non-zero pages marked as used in the RAM bitmap are saved into a file of a captured state image 240. Pages marked as used in the Zero bitmap are to be zeroed out upon restoring the OS. Both the RAM bitmap and the Zero bitmap are saved into the captured state image file after a file header and before the content of the volatile system memory 215. The captured state image 240 is then stored in nonvolatile image storage 235.

When loading and restoring a captured state image 240, the system transition routine 245, 250 writes a value in its working variables data structure to specify where the captured state image 240 is located, such as disk, flash memory, or the like, or if the image is stored in the volatile system memory 215. In some embodiments, data integrity tests are run on the image file to be loaded. In one example, the resulting captured state image is protected with cyclic redundancy code (CRC) to detect errors when loading. Using integrity testing such as CRC validation slows down the loading process and is optionally used. Integrity testing is most useful during development and to verify that a stored captured state image 240 is valid.

To increase the speed of loading an image and initializing the volatile system memory 215, some embodiments use an accumulating algorithm. In the accumulating algorithm, the system transition routine 245, 250 scans the RAM bitmap. A counter is used to track the number of contiguously used pages. When the system transition routine 245, 250 determines that a run of contiguously used pages has ended, the pages are read out of memory as a large block of data. If the data resides on an ATA or IDE type hard disk, the accumulating algorithm reads the data by accessing multiple sectors at one time. If the data resides in flash memory, a direct memory access (DMA) is used to access the data. The system transition routine 245, 250 also scans the Zero bitmap and uses a counter to track the number of contiguously zeroed pages. The DMA is used to zero out the pages in the volatile system memory 215.

If the OS is QNX, the pages marked as unused in the RAM bitmap must be zeroed out upon restore of QNX. Because it is sometimes too inefficient to use memory laundering and the accumulating algorithm to zero out all of the unallocated memory, in some embodiments, the zeroing is done in the background of the running OS after the OS is restored. In some of the embodiments, the header file of a state image 240 only includes the RAM bitmap and all other memory is deemed unused. All unused memory is allocated by the system transition routine 245, 250. After the OS is restored, volatile system memory 215 is released to the OS in blocks. When a used memory block is released to the OS, the OS zeros the memory if required. The total time to release the memory to the restored OS may take a few seconds and is therefore executed in the background. To guarantee that the applications have enough memory to run initially, a few megabytes less memory is allocated to the image than was available at the time the state image was captured; thereby guaranteeing there will be adequate memory immediately available for use by applications upon OS restore.

Content of a hard disk drive of the system 200 may change over time due to installing new or upgraded software applications, or upgrading an OS. Because contents of a hard disk of the system 200 may change, the OS must refresh its information about the hard drive file system when an OS captured state image is loaded and the corresponding OS is restored. Some operating systems, such as QNX for example, allow the root file system to be unmounted, even while software is executing. For these operating systems, the root file system is unmounted by the system capture routine 265 and then mounted during initialization whether the initialization is part of a power-up or an OS switch.

Other operating systems, such as Linux for example, do not allow the root file system to be unmounted while software is executing. For these operating systems, the root file system is always mounted as read-only. The OS maintains some information about the mounted file system, including its layout and content. This information is a representation of the hard disk file system and is called meta-data. This meta-data is part of the captured state image 240. This causes the captured state image 240 to be dependent on the hard drive layout and content. The root file system in this type of OS is divided into a plurality of domains including a read-only domain, a domain that remains open in volatile memory, and a domain that is writeable and mountable.

The first type of domain, the read-only root domain, cannot be unmounted by the system capture routine 265. Because it cannot be unmounted during the capture process, the contents of the root file system in this domain change only if a new captured state image is created. The read-only root domain includes the bulk of the files needed for normal operation of the OS including the meta-data, but generally do not include software applications that are commonly installed or upgraded. The read-only root domain must always be maintained as read-only during the normal operation of the system 200 to ensure that no changes are made that affect the disk content or layout. Any installation or upgrade of the read-only root domain must ensure that each system 200 with the installation or upgrade has an identical file system content and layout associated with the captured state image 240.

The second type of domain, the root file system domain that remains open, is stored in the volatile system memory 215. Because the files remain open, their contents change on each load of a captured state image 240. However, because the files in this root domain reside in volatile system memory 215, loading a captured state image 240 restores these files to an identical state upon each restore of the OS. All changes that occur subsequent to the loading of a captured state are lost with each image load and restore of an OS. Files in this domain are part of a captured image 240.

The third type of domain, the root file system domain that can be unmounted, includes all files that must change during OS operation. The OS restore must retain these changes. Before the image capture process, these files are closed and unmounted and are not part of a stored captured state image 240. After the OS is restored as part of a system initialization or OS switch, these file systems are mounted and the OS uses the current files.

Returning to FIG. 2A, in some embodiments of the system 200, the captured state image is loaded and the OS is restored using system management mode (SMM). SMM is special purpose operating mode provided in some Intel® microprocessors. In SMM, a state of a microprocessor is saved in system management RAM (SMRAM) while the microprocessor executes instructions of an SMM handler program that resides in the SMRAM. In some embodiments, the system transition routine 245 includes code to cause the microprocessor 210 to execute instructions in SMM to convert contents of volatile system memory 215 and microprocessor registers to a captured state in accordance with a non-executing OS captured state image 240 stored in the nonvolatile image storage 235. In some of the embodiments, the system 200 includes a system management interrupt (SMI) handler. The system transition routine 245 generates an SMI to be processed by the SMI handler when an application to be run on the system 200 requires a non-executing OS.

The SMI causes the microprocessor 210 to execute instructions in SMM. In some embodiments, the instructions executed in SMM cause the microprocessor 210 to transfer a portion the contents of memory to a data structure that is accessible by both the first and second operating systems before converting the contents of memory with a captured state image 240. In some embodiments, the data structure includes the file headers of the captured state images to indicate a location of a file and an amount of relevant data within the file.

In some embodiments, the communication circuit 205 off-loads the microprocessor 210 from the task of communicating with a medical device. The communication circuit 205 handles receiving and/or transmitting data under a communication protocol and reading or writing data into memory. The communication circuit 205 may include a microprocessor or microcontroller to handle these tasks. In some of the embodiments, a captured state image 240 includes contents to initialize the communication circuit. This is useful to quickly initialize the system 200 for an application that communicates with a medical device.

In some embodiments, the system 200 includes an electrocardiogram (ECG) subsystem. The ECG subsystem acquires data from a surface ECG of a patient. The subsystem receives electrical signals from patient lead connections and presents the signals to a user of the system 200 on a video display, strip chart recorder, or the ECG subsystem makes the signals available on an output port of the subsystem. In some embodiments, the ECG subsystem includes signal processors to process the received electrical signals. In some of the embodiments, a captured state image 240 includes contents to initialize the ECG subsystem.

In some embodiments, the system 200 includes a pacing system analyzer (PSA). A PSA is a subsystem that is connectable to cardiac pacing leads and provides a detailed assessment of the lead/patient interface. Such an assessment includes, among other things, a measurement of intrinsic pacing signal amplitudes, a pacing lead impedance measurement, a pacing threshold test, and pacing signal slew rate measurement. Some PSAs are also able to provide emergency pacing to a patient. In some embodiments, a captured state image 240 includes contents to initialize the PSA.

In some embodiments, the microcontroller 210 executes instruction code associated with three or more operating systems. The system 200 includes at least one captured state image 240 associated with each of the three or more operating systems. Each captured state image is associated with at least one application to be run using an operating system. Based on the application to be run, the system transition routine 245 loads a captured state image 240 associated with the OS used by the application and restores that OS on the system 200.

Figure 3:
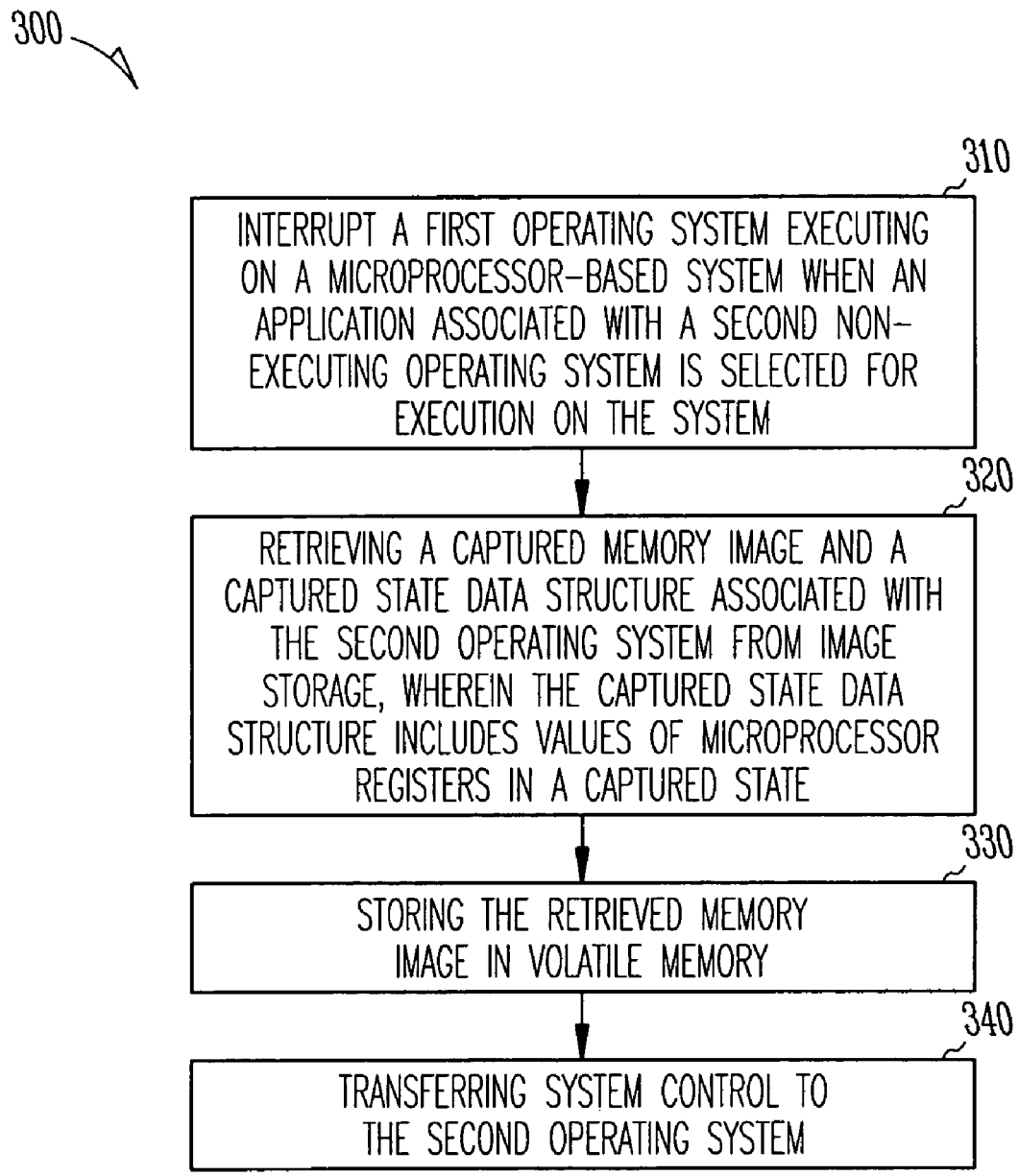
FIG. 3 shows a block diagram of one embodiment of a method for transitioning a microprocessor-based device from a first operating system to a second operating system.

FIG. 3 shows a block diagram 300 of one embodiment of a method for transitioning a microprocessor-based system from a first OS to a captured state of a second OS. At 310, a first OS executing on a microprocessor-based system is interrupted when an application associated with a second non-executing OS is selected for execution on the system. In some embodiments, the microprocessor-based system is configured as an external programmer for an implantable cardiac rhythm management device. As illustrative examples, the applications may include an electrocardiogram application, a pacing system analyzer application, or an application that communicates with a medical device separate from the microprocessor based system.

In some embodiments, the first OS is a primary OS. Restoration of the primary OS begins upon system power-up. Upon power-up, an image manager BIOS that includes a system transition routine and an operational BIOS are loaded by the system from nonvolatile memory and the operational BIOS begins executing. When the operational BIOS finishes its initializing tasks, the system transition routine then retrieves a captured state image of the primary OS from image storage into system memory and restores the primary OS to an operational state. After performing operations such as refreshing the date and time and mounting hard disk file systems, the system transition routine transfers control to the OS. A software application associated with the primary OS may then be run on the system. The primary OS or the software application is interrupted when an application associated with a secondary OS is selected for execution or a user simply powers down the system. The application for the secondary OS may be selected before the secondary OS begins execution.

At 320, a captured memory image and a captured state data structure associated with the second operating system are retrieved from image storage. The captured state data structure includes values of microprocessor registers in the captured state. In some embodiments, the captured state corresponds to one or more processes held in a suspended state by an OS. In some embodiments, the microprocessor-based system is a computing device and the processes include OS services and software applications. In some embodiments, the captured state corresponds to a quiescent state of an OS. In some embodiments, the captured state corresponds to an initial state of the microprocessor based system, and the captured state is used to quickly initialize the system upon switching to a secondary OS. In some embodiments, retrieving the captured memory image and the captured state data structure from image storage includes retrieving from an image storage medium selected from a group comprising a flash memory, a hard disk, an optical storage medium, or combinations including the image storage mediums.

In some embodiments, parameter data is transferred from a primary OS for use by a secondary OS. The parameter data is transferred to a file in memory that is usable by the secondary OS, the software application that requires the secondary OS, or both. The content of the data is not modified during an OS switch. The content and format of the parameter data need not be known to the OS switch routine, leaving the content and format to be determined by the primary OS (the source of the data) and secondary OS (the consumer of the data).

At 330, data retrieved from the captured memory image is restored to its original location in system volatile memory. In some embodiments, the retrieval and the storage of the captured state memory image are executed in parallel, such as for example, using direct memory access (DMA) to read and write large sections of memory.

In some of the embodiments, the retrieval and writing is managed by programmable hardware logic implementing PCI bus-mastering DMA. If the captured state image is an embodiment that includes bitmaps to identify used pages of physical memory, two execution threads are created to increase the efficiency of the DMA transfers. Each DMA is preceded by an analysis of a RAM or Zero bitmap; one thread analyzes the relevant bitmap depending on the phase of the memory restore process, while the other watches for completion of the previously initiated DMA transfer. As soon as a transfer finishes the DMA registers are loaded with the values for the next transfer, eliminating dead time used to analyze bitmaps between transfers.

In some embodiments, a bus-master DMA controller contains a register set large enough to hold an entire RAM bitmap. The bus-master DMA interprets the RAM bitmap and Zero bitmap and transfers the captured state image file to the correct pages indicated by the RAM bitmap and zeros the pages indicated by the Zero bitmap. This transfer does not require intervention by the system transition routine software or the OS.

At 340, system control is transferred to the second OS. In some embodiments, transferring control includes executing a branch to an address reserved for execution of the second OS. In some embodiments, a computer readable storage medium includes program code for a computer to execute embodiments of the method shown in FIG. 3.

According to some embodiments, the method further includes retrieving a captured memory image and a captured state data structure associated with the first OS from image storage. Thus, the image storage includes multiple captured state images of multiple operating systems. The retrieved memory image of the first OS is stored in system volatile memory. System control is then transferred to the first OS. In some embodiments, the captured memory image and a captured state data structure are retrieved and the first OS restored when the application using the second OS is exited. In some embodiments, the captured memory image and a captured state data structure are retrieved and the first OS restored when an application is selected that requires the first OS. In some embodiments, the captured state images and data structures are retrieved while the microprocessor executes instructions in system management mode (SMM). In some embodiments, the captured state images and data structures are retrieved using direct memory access (DMA). In some embodiments, the DMA stores the captured state images in parallel with the retrieval process.

According to some embodiments, paging is turned off in the microprocessor system while the captured state images and data structures are retrieved. Paging then needs to be restored. In some embodiments, transferring system control to the second OS includes enabling memory paging, initializing peripheral hardware devices, running integrity tests, and running the processes held in a suspended state by the OS.

In some embodiments, retrieving the captured memory image includes retrieving a memory image corresponding to at least one page in linear address space that is mapped in the captured state into at least one page frame of physical address space by a paging mechanism. Storing the retrieved memory image in volatile memory includes storing the retrieved memory image in volatile memory in a manner that restores the at least one page frame in accordance with information derived from paging tables in active memory.

Paging tables describe which physical pages of memory are in use and map them to addresses in linear address space used by software applications. When the system transition routine disables paging during an OS switch or an image capture, all physical memory becomes available to the transition routine and no address translation is done. When the OS is restored, the content of memory has now changed, and they contain page tables corresponding to the captured OS. When the Page Table Pointer in a processor is loaded with the same address that was used during capture of the OS image and the paging is turned on, the system immediately begins using the paging tables as if paging was never turned off. Note that during capture and restore processes, paging is turned off and physical memory pages that were in use by the OS are sequentially saved into the image file or restored from it according to their original addresses in physical memory. During the restore process, information from the page tables is ignored.

In some embodiments, retrieving a captured state memory image includes restoring volatile system memory pages from an image file pre-loaded in volatile system memory. In some embodiments, retrieving a memory image includes restoring memory pages from an image file in nonvolatile memory. In some embodiments, retrieving a memory image includes restoring memory pages from an image file on a disk memory partition such as a FAT16 or FAT32 hard disk partition.

According to some embodiments, the method further includes creating the captured memory image and captured state data structure and storing the captured memory image and captured state data structure in the image storage medium. Embodiments of the method create the captured state images and data structures in different ways. In some embodiments, the captured state images and data structures are created by running a system capture routine on the microprocessor-based system. In some embodiments, this involves initializing the system to the desired state of an OS before capturing the state image. For example, this state could be a quiescent state of the system. In another example, this could be a point part-way through OS initialization. In one embodiment, this includes the execution of a software application allowing it to perform much of its own initialization to a point where the application pauses while waiting for, or invoking, the system capture routine. In some embodiments, a routine is executed on a microprocessor-based system during system production to write the captured state image and data structure to the image storage medium and, if necessary, write the read-only root file system to hard disk. In some embodiments, a routine is executed on the microprocessor-based system during system repair to write the captured state image and data structure to the image storage medium and, if necessary, write the read-only root file system to hard disk.

In some embodiments, the images are created before or during the production process. The system capture routine is run on a development system. A development system includes a system at the prototype stage, a system in the early stages of production, or a master system used to create the desired images and data structures. The created captured state images and data structures are then provided on an image storage medium with the production systems. In some embodiments, providing the captured images includes running an installation routine on the systems under production to transfer captured state images to the image storage medium.

According to some embodiments, creating the captured memory image includes reducing an amount of memory used by the captured state image. In some embodiments, reducing the amount of memory includes memory laundering of the captured state image or using data compression methods. In some embodiments, reducing the amount of memory includes compressing the data stored in memory. In some embodiments, unused portions of volatile system memory are excluded from the captured memory image.

Hard drive contents for a system may change over time due to upgrading or installing new software applications. The OS must refresh its information about the file system or systems when an OS captured state image is loaded and the corresponding OS is restored. In some embodiments, creating a captured state memory image includes unmounting a root file system associated with an OS. The method further includes mounting the root file system when the OS is restored before releasing control to any OS service, driver, or application that needs to use the hard disk. In some embodiments, creating the captured memory image includes storing file system metadata for a root file system in the captured state image.

In general, a captured state image file that resides completely in flash memory will be restored much faster than an image file that resides even partly on disk. This is because flash memory access time is much lower than the time required to access disk memory. Thus, it is sometimes desired to manage the size of image files so that the files completely reside in system flash memory.

In an embodiment, the amount of memory in use when a system state image is captured is reduced until the resulting image file just fits within available flash memory. The process of reducing the amount of memory in use by the system or conversely, increasing the amount of free memory, just before the image is captured is called memory pruning because pages of the memory are freed-up or "pruned" from the image file until the amount of used memory fits within the flash. The pruning algorithm runs according to a watermark concept, i.e. the algorithm prunes the least recently used (LRU) memory while the number of free memory pages is below the target memory amount (the "watermark" amount). When the number of free pages exceeds this amount, the captured state image is saved in an image file that fits within flash memory. When the image file is captured, it is saved by any of the methods and within any of the mediums discussed above. In an active system, the image file resides in flash memory until the OS corresponding to the image file is restored.

The memory pruning algorithm first uses the LRU algorithm to identify the oldest unreferenced pages. If the number of free memory pages is below the watermark, pages identified by the LRU algorithm are deactivated. Deactivated pages are then cleaned, or zeroed, if necessary. The deactivated clean pages are then added to a list of free memory pages. When the number of free memory pages exceeds the watermark, the algorithm is done. Below is an example of pseudo-code that implements an embodiment of a pruning algorithm.

Pruning Algorithm Pseudo-Code:

```
Prepare_for_Capture( )
    Start_Pruning( )
        If (!Target_Free_Mem_Reached)
        {
            Reduce memory_in_PageCache;
            For each memory zone
                Rebalance inactive list( );
                Scan active list;
                Deactivate_pages not currently used (based on
                LRU);
                Move_pages to the inactive dirty list;
                Move_pages to inactive laundry list;
                    If ! Page_clean
                        Clean_Pages( );
                If (IO_operation)
                    Complete_IO_operation( );
                Move_pages inactive laundry list to inactive
                    clean list
        /* Pages on inactive clean list are in sync with backing store. */
        /* These pages may be deallocated and made available for use */
                Free_Pages = Free_Pages + inactive_clean_
                list_pages;
                If (Free_Pages >= Target_Free_Pages)
                    Set Flag for Target_Free_Mem_Reached;
                    Exit Loop;
                else
                    go to beginning_of_loop Start_Pruning ( )
```

In an embodiment of managing the size of image files, the pages are "aged" by a background sort of the pages in virtual memory according to a LRU algorithm. The sorting function is run in the system background about once a second when there are no accesses to virtual memory or the number of accesses to virtual memory is low. Because it runs in the background, the page aging uses minimal CPU time under typical system loads.

In another embodiment, the size of the image file is configurable to be an amount that exceeds or is less than the amount of available flash. A user of the algorithm, such as a system developer, specifies the target amount of memory for the image file. A memory pruning or a page-laundering algorithm is run until the target amount of memory is hit. In an active system, the resulting image file is then restored by a combination of flash memory load and paging-in of the file from hard disk. Typically, the portion of the file that resides in flash loads quickly while the portion on disk takes longer to load. Thus, the time required for an image file to be restored varies depending on the amount of the file stored in flash relative to the amount stored on disk. This dynamic approach allows the system developer to find a balance between the quality of the image and the speed of restoring an OS.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

The following statements of the disclosure are intended to characterize possible elements of the invention according to the foregoing description given in the specification. A medical device system, such as a medical device programmer includes a communication circuit, a microprocessor coupled to the communication circuit, a volatile system memory in communication with the microprocessor, a nonvolatile memory to store data such as executable startup code, nonvolatile image storage to store data such as a captured state image, and a system transition routine to transition the system between the executing operating system and the non-executing operating system. The microprocessor has registers and is operable to execute instruction code associated with at least a first operating system and a second operating system. Only one operating system executes at a time. The volatile system memory is adapted to store executable code, including code of an executing operating system. The captured state image includes an image of memory and microprocessor registers in a captured state. The captured state is associated with a non-executing operating system. When an application to be run on the microprocessor requires the non-executing operating system, the system transition routine converts content of volatile memory and microprocessor registers to a captured state in accordance with the non-executing operating system captured state image stored in the nonvolatile image storage. The image storage includes at least a first captured state image associated with the first operating system and at least a second captured state image associated with the second operating system. The first captured state image is associated with a first software application that uses the first operating system in an embodiment. The second captured state image is associated with a second software application that uses the second operating system in an embodiment. The captured state image has a reduced copy of contents of system memory in the captured state in an embodiment. The captured state image excludes contents of a portion of the system memory in an embodiment. The image storage includes flash memory, or EPROM, or both in an embodiment. The image storage includes disk memory in an embodiment. A captured state image is transferred from the disk memory to volatile system memory. The system transition routine includes machine executable code to retrieve a memory image and a captured state data structure from the image storage such that the memory image corresponds to pages in a linear address space that are mapped in the captured state into page frames of physical address space by a paging mechanism in an embodiment. The captured state data structure has values of microprocessor registers in the captured state in an embodiment. The system transition routine is adapted to load microprocessor registers with values in the captured state data structure and to store the memory image in the volatile system memory in a manner that restores the page frames of the captured state. The system is capable of transitioning from an assertion of power-on-reset to the first operating system to the second operating system in less than seven seconds in an embodiment.

The first and second operating systems include QNX and Linux in an embodiment. The image storage includes a captured state image associated with a QNX operating system within a captured state image associated with a Linux operating system in an embodiment. The system transition routine converts contents of the volatile system memory to a QNX captured image by first retrieving the Linux captured image from the nonvolatile image storage in an embodiment. The image storage includes a captured state image associated with a QNX operating system stored as a file associated with a Linux memory partition in an embodiment. The system transition routine converts contents of the volatile system memory to a QNX captured image by first retrieving the Linux captured image from the nonvolatile image storage in an embodiment. The image storage includes a captured state image associated with a QNX operating system in an embodiment. The system transition routine converts contents of the volatile system memory to a QNX captured state image by loading the QNX image directly from the nonvolatile image storage. In an embodiment, the captured state image in the image storage includes contents of a video memory. The captured state image contained in the image storage includes contents to initialize the communication circuit in an embodiment.

The system as described herein is used with medical devices. In an embodiment, the system includes an electrocardiogram subsystem and the captured state image contained in the image storage includes contents to initialize the electrocardiogram subsystem. In an embodiment, the system includes a pacing system analyzer and a captured state image contained in the image storage includes contents to initialize the pacing system analyzer. The microprocessor-based system is configured as an external programmer for an implantable cardiac rhythm management device that stores initialization information for the external programmer.

The system transition routine includes a system capture routine that captures an image of system memory corresponding to a quiescent state of an operating system and a system capture routine stores a captured state image on the image storage. The system capture routine includes code to unmount a root file system and store the root file system in the captured state image. The system capture routine includes code to divide the root file system into a plurality of root file domains including a domain that is read-only, a domain that remains open in volatile memory, and a domain that is unmountable and writeable, and the captured state image includes files in the domain that remains open. The read-only root domain includes meta-data files that are included in the captured state image. The system transition routine includes code to remount a root file system associated with the second operating system. The system further includes a disk drive in an embodiment. The system transition routine includes code to prevent the disk drive from spinning down.

A method for use with a medical device that includes interrupting a first operating system executing on a microprocessor-based system when an application associated with a second non-executing operating system is selected for execution on the system. The method retrieves a captured memory image and a captured state data structure associated with the second operating system from image storage. The captured state data structure includes values of microprocessor registers in a captured state in an embodiment. The method further stores the retrieved memory image in volatile memory and transfers system control to the second operating system. In an embodiment, the method retrieves a captured memory image and a captured state data structure associated with the first operating system from an image storage medium. In an embodiment, the method stores the retrieved memory image in volatile memory. In an embodiment, the method transfers system control to the first operating system. In an embodiment, the method retrieves when the application associated with the second operating system is exited. In an embodiment, the method, retrieves when an application associated with the first operating system is selected. In an embodiment, the method retrieves a memory image corresponding to at least one page in linear address space that is mapped in the captured state into at least one page frame of physical address space by a paging mechanism. In an embodiment, the method stores the retrieved memory image in volatile memory in a manner that restores the at least one page frame in accordance with information derived from paging tables in active memory. In an embodiment, the method restores memory pages from a file pre-loaded in volatile memory. In an embodiment, the method restores memory pages from a file in nonvolatile memory. In an embodiment, the method restores memory pages from a file on a disk memory partition. In an embodiment, the method retrieves a captured memory image and a captured state data structure corresponding to a captured state of one or more user processes held in a suspended state by an operating system. In an embodiment, the method restores enables memory paging; initializing peripheral hardware devices, runs integrity tests, and runs the processes held in a suspended state by the operating system. In an embodiment, the method retrieves from an image storage medium such as a flash memory, a hard disk, an optical storage medium, or combinations including the image storage mediums. In an embodiment, the method executes retrieval and store processes in parallel. In an embodiment, the method transfers the retrieved memory image into pages of system memory based on a RAM bitmap using direct memory access (DMA). In an embodiment, the method creates the captured memory image and captured state data structure and stores the captured memory image and captured state data structure in the image storage medium. In an embodiment, the method executes a system capture routine on the microprocessor-based system. In an embodiment, the method moves the microprocessor-based system to the captured state using a captured state process and executing the system capture routine. In an embodiment, the method reduces an amount of memory used by the captured state image by running a data compression algorithm. In an embodiment, the method creates the captured memory image and the captured state data structure by executing a system capture routine on a development system and transfers the captured memory image and the captured state data structure on the image storage medium to a system under production. In an embodiment, the method executes a system capture routine on a system under production and stores the captured memory image and the captured state data structure on the image storage medium on the system under production. In an embodiment, the method operates on a system under repair and stores the captured memory image and the captured state data structure on the image storage medium on the system under repair. In an embodiment, the method creates the captured memory image by unmounting a root file system and mounts a root file system associated with the second operating system before transferring processor execution to the second operating system. In an embodiment, the method captures a state of portions of a root file system in the captured state image.

Any of the methods and steps can be implemented in hardware or software. In a software embodiment, a computer readable storage medium containing code to implement methods or some steps as described herein. The code includes steps for transitioning a microprocessor-based system from a first executing operating system to a second non-executing operating system. In an embodiment, the computer readable medium includes code for: interrupting the first executing operating system when an application associated with the second non-executing operating system is selected for execution on the system; retrieving a captured memory image and a captured state data structure associated with the second operating system from an image storage medium, wherein the captured state data structure contains values of microprocessor registers in a captured state; storing the retrieved memory image in volatile memory; and transferring system control to the second operating system. The present invention further includes embodiments of a computer readable storage medium containing code to implement any of the methods or steps described herein.

The system as described herein includes a transition routine to transition between the executing and the non-executing operating systems when an application to be run on the microprocessor requires the non-executing operating system. The transition routine includes code to cause the microprocessor to execute instructions in system management mode (SMM) to convert contents of volatile memory and microprocessor registers to a captured state in accordance with the non-executing operating system captured state image stored in the nonvolatile image storage. In an embodiment, the nonvolatile image storage includes at least one captured state image associated with the second operating system and at least one captured state image associated with the first operating system. In an embodiment, system includes a system management interrupt (SMI) handler. The system transition routine generates an SMI to be processed by the interrupt handler when an application to be run on the system requires the non-executing operating system. The SMI causes the microprocessor to execute instructions in SMM. The instructions (code) executed in SMM cause the microprocessor to convert contents of volatile system memory to a captured state by transferring a captured state image from the nonvolatile image storage to the volatile system memory in a manner that restores page frames of the captured state image. In an embodiment, the system has an interface to transfer data between a primary operating system and a secondary operating system. In an embodiment, instructions executed in SMM cause the microprocessor to transfer memory contents to a data structure accessible by both the first and second operating systems. In an embodiment, the instructions executed in SMM cause the microprocessor to load a system management random access memory (SMRAM) area with at least a portion of a captured state image, and wherein the instructions executed in SMM include a resume instruction that loads the captured state from the SMRAM area into the microprocessor. In an embodiment, the resume instruction further causes the microprocessor to return to the operating switching routine and restore an additional portion of a captured state image stored outside of the SMRAM area. In an embodiment, the first and second operating systems include QNX and Linux. In an embodiment, an electrocardiogram subsystem coupled to the microprocessor and the captured state image in the image storage includes contents to initialize the electrocardiogram subsystem.

The system includes a direct memory access (DMA) controller operable to store information in the volatile system memory and retrieve information from the nonvolatile system memory. The DMA controller is operable to interpret the contents of a RAM bitmap and a zero bitmap. A system transition routine transitions the system between an executing operating system and a non-executing operating system when an application to be run on the microprocessor requires the non-executing operating system. The transition routine includes a DMA controller initialization routine to load the Ram bitmap and the zero bitmap into the DMA controller and start a DMA operation. The DMA operation converts content of volatile memory to a captured state in accordance with the non-executing operating system captured state image stored in the nonvolatile image storage. An operating system switching routine converts content of microprocessor registers and transitions control of the system to the non-executing operating system. A system capture routine creates captured state images of volatile system memory and stores the captured state images on the nonvolatile image storage. In an embodiment, a captured state image of a first operating system includes a captured state image of the second operating system. The DMA controller initialization routine converts content of volatile system memory to a captured state in accordance with a first operating system captured state image and stores a second operating system captured state image in volatile system memory. The DMA controller initialization routine converts content of volatile system memory to a captured state in accordance with the second operating system captured state image stored in the volatile system memory when an application to be run on the microprocessor requires the second operating system. In an embodiment, the first operating system is a primary operating system. In an embodiment, the DMA controller initialization routine converts content of volatile system memory to a captured state in accordance with a primary operating system captured state image upon system power-up. In an embodiment, the system transition routine converts content of microprocessor registers to a captured state prior to executing the first or second operating system.

What is claimed is:

1. A medical device system comprising:
    a communication circuit;
    a microprocessor coupled to the communication circuit, the microprocessor having registers, and the microprocessor operable to execute instruction code associated with at least a first operating system and a second operating system, where only one operating system executes at a time, a portion of the instruction code executed to communicate with a medical device;
    a volatile system memory in communication with the microprocessor, the volatile system memory to store executable code, including code of an executing operating system;
    a nonvolatile memory to store executable startup code;
    nonvolatile image storage to store at least one captured state image, wherein the captured state image includes an image of memory and microprocessor registers in a captured state, the captured state associated with a non-executing operating system;
    a system transition routine to transition the system between the executing operating system and the non-executing operating system when an application to be run on the microprocessor requires the non-executing operating system, wherein the system transition routine converts content of volatile memory and microprocessor registers to a captured state in accordance with the non-executing operating system captured state image stored in the nonvolatile image storage; and
    wherein the image storage includes at least a first captured state image associated with the first operating system and at least a second captured state image associated with the second operating system, and wherein the second captured state image is stored within the first captured state image.

2. The system of claim 1, wherein the system transition routine transitions the system between the executing operating system and the non-executing operating system without saving a state of the executing operating system.

3. The system of claim 1, wherein the first captured state image is associated with a first software application that uses the first operating system, and the second captured state image is associated with a second software application that uses the second operating system.

4. The system of claim 1, wherein the captured state image comprises a reduced copy of contents of system memory in the captured state.

5. The system of claim 1, wherein the captured state image excludes contents of a portion of the system memory.

6. The system of claim 1, wherein the image storage includes flash memory, or EPROM, or both.

7. The system of claim 1, wherein the image storage includes disk memory and a captured state image is transferred from the disk memory to volatile system memory.

8. The system of claim 1, further comprising:
    code in the system transition routine to retrieve a memory image and a captured state data structure from the image storage, wherein the memory image corresponds to pages in a linear address space that are mapped in the captured state into page frames of physical address space by a paging mechanism, and wherein the captured state data structure comprises values of microprocessor registers in the captured state; and code in the system transition routine to load microprocessor registers with values in the captured state data structure and to store the memory image in the volatile system memory in a manner that restores the page frames of the captured state.

9. The system of claim 1, wherein the system is capable of transitioning from an assertion of power-on-reset to the first operating system to the second operating system in less than seven seconds.

10. The system of claim 1, wherein the first and second operating systems include QNX and Linux.

11. The system of claim 10, wherein the image storage includes a captured state image associated with a QNX operating system within a captured state image associated with a Linux operating system, and the system transition routine converts contents of the volatile system memory to a QNX captured image by first retrieving the Linux captured image from thenonvolatile image storage.

12. The system of claim 10, wherein the image storage includes a captured state image associated with a QNX operating system stored as a file associated with a Linux memory partition, and the system transition routine converts contents of the volatile system memory to a QNX captured image by first retrieving the Linux captured image from the nonvolatile image storage.

13. The system of claim 10, wherein the image storage includes a captured state image associated with a QNX operating system, and the system transition routine converts contents of the volatile system memory to a QNX captured state image by loading the QNX image directly from the nonvolatile image storage.

14. The system of claim 1, wherein the captured state image in the image storage 15. The system of claim 1, wherein the captured state image contained in the image storage includes contents to initialize the communication circuit.

16. The system of claim 1, wherein the system further includes an electrocardiogram subsystem, and wherein the captured state image contained in the image storage includes contents to initialize the electrocardiogram subsystem.

17. The system of claim 1, wherein the system further includes a pacing system analyzer, and wherein a captured state image contained in the image storage includes contents to initialize the pacing system analyzer.

18. The system of claim 1, wherein the system transition routine includes a system capture routine, wherein the system capture routine captures an image of system memory corresponding to a quiescent state of an operating system, and wherein the system capture routine stores a captured state image on the image storage.

19. The system of claim 18, wherein the system capture routine includes code to unmount a root file system and store the root file system in the captured state image.

20. The system of claim 18, wherein the system capture routine is configured to divide the root file system into a plurality of root file domains including a domain that is read-only, a domain that remains open in volatile memory, and a domain that is unmountable and writeable, and wherein the captured state image includes files in the domain that remains open.

21. The system of claim 20, wherein the read-only root domain includes meta-data files that are included in the captured state image.

22. The system of claim 1, wherein the system transition routine includes code to remount a root file system associated with the second operating system.

23. The system of claim 1, wherein the system further includes a disk drive, and wherein the system transition routine includes code to prevent the disk drive from spinning down.

24. A method comprising:
loading a first captured state image from non-volatile memory into volatile memory, wherein the first captured state image is associated with a first operating system and includes a second captured state image within the first captured state image, wherein the second captured state image is associated with a second operating system and is loaded into volatile memory with the first captured state image;
interrupting a first operating system executing on a microprocessor-based medical device system when an application associated with a second non-executing operating system is selected for execution on the system;
retrieving a captured memory image and a captured state data structure associated with the second operating system from volatile image storage; and
transferring system control to the second operating system.

25. The method of claim 24, further including:
retrieving a captured memory image and a captured state data structure associated with the first operating system from the volatile image storage without first saving a state of the first operating system; and
transferring system control to the first operating system.

26. The method of claim 25, wherein retrieving a captured memory image and a captured state data structure associated with the first operating system from an image storage medium includes retrieving when the application associated with the second operating system is exited.

27. The method of claim 25, wherein retrieving a captured memory image and a captured state data structure associated with the first operating system from an image storage medium includes retrieving when an application associated with the first operating system is selected.

28. The method of claim 24, wherein retrieving the captured memory image includes retrieving a memory image corresponding to at least one page in linear address space that is mapped in the captured state into at least one page frame of physical address space by a paging mechanism, and wherein storing the retrieved memory image in volatile memory includes storing the retrieved memory image in volatile memory in a manner that restores the at least one page frame in accordance with information derived from paging tables in active memory.

29. The method of claim 28, wherein retrieving a memory image includes restoring memory pages from a file in non-volatile memory.

30. The method of claim 28, wherein retrieving a memory image includes restoring memory pages from a file on a disk memory partition.

31. The method of claim 24, wherein retrieving a captured memory image and a captured state data structure includes retrieving a captured memory image and a captured state data structure corresponding to a captured state of one or more user processes held in a suspended state by an operating system.

32. The method of claim 24, wherein transferring system control to the second operating system includes:
enabling memory paging;
initializing peripheral hardware devices;
running integrity tests; and running the processes held in a suspended state by the operating system.

33. The method of claim 24, wherein storing the retrieved memory image in volatile memory includes executing retrieval and store processes in parallel.

34. The method of claim 33, wherein executing retrieval and store processes in parallel includes transferring the retrieved memory image into pages of system memory based on a RAM bitmap using direct memory access (DMA).

35. The method of claim 24, further including:
creating the captured memory image and captured state data structure; and
storing the captured memory image and captured state data structure in the image storage medium.

36. The method of claim 35, wherein creating the captured memory image includes reducing an amount of memory used by the captured state image.

37. The method of claim 36, wherein reducing an amount of memory used by the captured state image includes reducing to fit within a size of system flash memory.

38. The method of claim 36, wherein reducing an amount of memory used by the captured state image includes using memory page laundering.

39. The method of claim 35, wherein creating and storing the captured memory image and the captured state data structure includes:
creating the captured memory image and the captured state data structure by executing a system capture routine on a development system;
transferring the captured memory image and the captured state data structure on the image storage medium to a system under production.

40. The method of claim 35, wherein creating and storing the captured memory image and the captured state data structure includes:
creating the captured memory image and the captured state data structure by executing a system capture routine on a system under production; and
storing the captured memory image and the captured state data structure on the image storage medium on the system under production.

41. The method of claim 35, wherein creating and storing the captured memory image and the captured state data structure includes:
creating the captured memory image and the captured state data structure by executing a system capture routine on a system under repair; and
storing the captured memory image and the captured state data structure on the image storage medium on the system under repair.

42. The method of claim 35, wherein creating the captured memory image includes unmounting a root file system, and wherein the method further includes mounting a root file system associated with the second operating system before transferring processor execution to the second operating system.

43. The method of claim 24, wherein the microprocessor-based system is configured as an external programmer for an implantable cardiac rhythm management device, and storing the retrieved memory image in volatile memory includes storing initialization information for the external programmer.

44. A system comprising:
a communication circuit;
a microprocessor coupled to the communication circuit, the microprocessor having registers, and the microprocessor operable to execute instruction code associated with at least first and second operating systems, where only one operating system executes at a time, a portion of the executable code for communicating with a medical device;
a volatile system memory in communication with the microprocessor, the volatile system memory to store executable code, including code of an executing operating system;
a nonvolatile memory to store executable startup code;
nonvolatile image storage to store at least a first captured state image associated with the first operating system and at least a second captured state image associated with the second operating system, wherein the second captured state image is stored within the first captured state image, and wherein a captured state image includes an image of memory and microprocessor registers in a captured state; and
a system transition routine to transition between the executing and the non-executing operating systems when an application to be run on the microprocessor requires the non-executing operating system, wherein the system transition routine includes code to cause the microprocessor to execute instructions in system management mode (SMM) to convert contents of volatile memory and microprocessor registers to a captured state in accordance with the non-executing operating system captured state image.

45. The system of claim 44, wherein the system transition routine transitions the system between the executing operating system and the non-executing operating system without saving a state of the executing operating system.

46. The system of claim 44, wherein the system includes an system management interrupt (SMI) handler, wherein the system transition routine generates an SMI to be processed by the interrupt handler when an application to be run on the system requires the non-executing operating system, and wherein an SMI causes the microprocessor to execute instructions in SMM.

47. The system of claim 44, wherein the instructions executed in SMM cause the microprocessor to convert contents of volatile system memory to a captured state by transferring a captured state image from the nonvolatile image storage to the volatile system memory in a manner that restores page frames of the captured state image.

48. The system of claim 44, wherein the system further includes an interface to transfer data between a primary operating system and a secondary operating system.

49. The system of claim 44, wherein the interface includes a data structure, and wherein the instructions executed in SMM cause the microprocessor to transfer memory contents to a data structure accessible by both the first and second operating systems.

50. The system of claim 44, wherein the instructions executed in SMM cause the microprocessor to load a system management random access memory (SMRAM) area with at least a portion of a captured state image, and wherein the instructions executed in SMM include a resume instruction that loads the captured state from the SMRAM area into the microprocessor.

51. The system of claim 50, wherein the resume instruction further causes the microprocessor to return to the operating switching routine and restore an additional portion of a captured state image stored outside of the SMRAM area.

52. The system of claim 44, wherein the first and second operating systems include QNX and Linux.

53. The system of claim 44, further including an electrocardiogram subsystem coupled to the microprocessor and wherein the captured state image in the image storage includes contents to initialize the electrocardiogram subsystem.

54. A system comprising:

a communication circuit;

a microprocessor coupled to the communication circuit, the microprocessor having registers, and the microprocessor operable to execute instruction code associated with at least a first operating system and a second operating system, where only one operating system executes at a time, a portion of the instruction code executed to communicate with a medical device;

a volatile system memory in communication with the microprocessor, the volatile system memory to store executable code, including code of an executing operating system;

a nonvolatile memory to store executable startup code;

nonvolatile image storage to store a plurality of captured state images, wherein a captured state image includes an image of memory and microprocessor registers in a captured state, the captured state associated with one of the plurality of operating systems;

a direct memory access (DMA) controller operable to store information in the volatile system memory and retrieve information from the nonvolatile system memory, the DMA controller operable to interpret the contents of a RAM bitmap and a zero bitmap; and a system transition routine to transition the system between an executing operating system and a non-executing operating system when an application to be run on the microprocessor requires the non-executing operating system, the transition routine including:

a DMA controller initialization routine to load the Ram bitmap and the zero bitmap into the DMA controller and start a DMA operation, the DMA operation to convert content of volatile memory to a captured state in accordance with the non-executing operating system captured state image stored in the nonvolatile image storage;

a operating system switching routine to convert content of microprocessor registers and to transition control of the system to the non-executing operating system; and a system capture routine to create captured state images of volatile system memory and store the non-executing operating system captured state image within an executing operating system captured state image on the nonvolatile image storage.

55. The system of claim 54, wherein a captured state image of a first operating system includes a captured state image of the second operating system, wherein the DMA controller initialization routine converts content of volatile system memory to a captured state in accordance with a first operating system captured state image and stores a second operating system captured state image in volatile system memory.

56. The system of claim 55, wherein the DMA controller initialization routine converts content of volatile system memory to a captured state in accordance with the second operating system captured state image stored in the volatile system memory when an application to be run on the microprocessor requires the second operating system.

57. The system of claim 56, wherein the first operating system is a primary operating system and wherein the DMA controller initialization routine converts content of volatile system memory to a captured state in accordance with a primary operating system captured state image upon system power-up.

58. The system of claim 57, wherein the system transition routine converts content of microprocessor registers to a captured state prior to executing the first or second operating system.

* * * * *

UNITED STATES PATENT AND TRADEMARK OFFICE
CERTIFICATE OF CORRECTION

PATENT NO.          : 7,529,921 B2
APPLICATION NO.  : 11/253000
DATED                  : May 5, 2009
INVENTOR(S)         : Stein et al.

Page 1 of 1

It is certified that error appears in the above-identified patent and that said Letters Patent is hereby corrected as shown below:

In column 23, line 22, in Claim 11, delete "thenonvolatile" and insert -- the nonvolatile --, therefor.

In column 23, line 37, in Claim 14, after "storage" insert -- includes contents of a video memory. --.

Signed and Sealed this

Twenty-first Day of July, 2009

JOHN DOLL
*Acting Director of the United States Patent and Trademark Office*